United States Patent
Barua et al.

(10) Patent No.: US 7,367,024 B2
(45) Date of Patent: Apr. 29, 2008

(54) COMPILER-DRIVEN DYNAMIC MEMORY ALLOCATION METHODOLOGY FOR SCRATCH-PAD BASED EMBEDDED SYSTEMS

(75) Inventors: Rajeev Kumar Barua, Rockville, MD (US); Sumesh Udayakumaran, Hyattsville, MD (US)

(73) Assignee: University of Maryland, Riverdale, MD (US)

( * ) Notice: Subject to any disclaimer, the term of this patent is extended or adjusted under 35 U.S.C. 154(b) by 588 days.

(21) Appl. No.: 10/945,651

(22) Filed: Sep. 21, 2004

(65) Prior Publication Data

US 2006/0080372 A1  Apr. 13, 2006

(51) Int. Cl.
*G06F 9/45* (2006.01)

(52) U.S. Cl. .................. 717/157; 717/153; 717/158; 717/160

(58) Field of Classification Search ........... 717/140, 717/164

See application file for complete search history.

(56) References Cited

U.S. PATENT DOCUMENTS 6,108,797 A * 8/2000 Lin et al. ................... 714/8
6,970,985 B2 * 11/2005 Moritz ....................... 711/154

OTHER PUBLICATIONS

M. Kandemir "Dynamic Management of Scratch-Pad Memory Space", ACM . . . , Jun. 18, 2001, pp. 690-695.*

Manish Verma, Lars Wehmeyer, Peter Marwedel; Dynamic Overlay of Schratchpad Memory for Energy Minimization; pp. 104-109; Department of Computer Science XII; University of Dortmund, 44225 Dortmund, Germany, published in CODES+ISSS'04, Sep. 8-10, 2004, Stockholm, Sweden.

Ramanujam et al. "Dynamic Management of Scratch-Pad Memory Space"; pp. 690-695.

Moritz et al., "FlexCache: A Framework for Flexible Compiler Generated Data Caching", thirteen pages.

Avissar et al., "An Optimal Memory Allocation Scheme for Scatch-Pad-Based Embedded Systems", pp. 6-28.

Hallnor et al., A Fully Associative Software-Managed Cache Design, pp. 107-116.

Banakar et al., "Scratchpad Memory: A Design Alternative for Cache On-Chip Memory in Embedded Systems", 6 pages.

* cited by examiner

*Primary Examiner*—Tuan Dam
*Assistant Examiner*—Isaac T Tecklu
(74) *Attorney, Agent, or Firm*—Carter, DeLuca, Farrell & Schmidt, LLP

(57) ABSTRACT

A highly predictable, low overhead and yet dynamic, memory allocation methodology for embedded systems with scratch-pad memory is presented. The dynamic memory allocation methodology for global and stack data (i) accounts for changing program requirements at runtime; (ii) has no software-caching tags; (iii) requires no run-time checks; (iv) has extremely low overheads; and (v) yields 100% predictable memory access times. The methodology provides that for data that is about to be accessed frequently is copied into the SRAM using compiler-inserted code at fixed and infrequent points in the program. Earlier data is evicted if necessary.

36 Claims, 2 Drawing Sheets

COMPILER-DRIVEN DYNAMIC MEMORY ALLOCATION METHODOLOGY FOR SCRATCH-PAD BASED EMBEDDED SYSTEMS

STATEMENT REGARDING FEDERALLY SPONSORED RESEARCH

This invention was made with government support under NSF contract no. CNS-0133519 awarded by the National Science Foundation. The government has certain rights in this invention.

BACKGROUND OF THE INVENTION

1. Technical Field

The disclosure relates to memory allocation algorithms for embedded systems. In particular, the disclosure relates to compiler-driven dynamic memory allocation methodology for scratch-pad based embedded systems.

2. Description of the Prior Art

In both desktops and embedded systems many different kinds of memory are available, such as SRAM, DRAM, ROM, EPROM, Flash, non-volatile RAM and so on. Among the writeable memories—SRAM and DRAM—SRAM is fast but expensive while DRAM is slower (often by a factor of 10 or more) but less expensive (by a factor of 20 or more). To combine their advantages, the usual approach is to use a large amount of DRAM to build capacity at low expense and then to speed up the program add a small amount of SRAM to store frequently used data. Using SRAM is critical to performance; for example, typically by adding a small SRAM results in an average of 2.5× lowering of runtime in a typical embedded configuration as compared with using DRAM only. This gain from SRAM is likely to increase since the speed of SRAM is increasing by 60% a year versus only 7% a year for DRAM.

In desktops, the usual approach to adding SRAM is to configure it as a hardware cache. The caching mechanism stores a subset of the frequently used memory in the cache. Caches have been a big success for desktops, a trend that is likely to continue in the foreseeable future. The other alternative of using the SRAM as a scratch-pad under software control, is not a serious competitor.

For embedded systems, however, the overhead of caches comes with a more serious price. Caches incur a significant penalty in aspects like area cost, energy, hit latency and real-time guarantees. All these criteria, other than hit latency, are more important for embedded systems than desktops. Embedded computing systems refer to devices other than dedicated computers having computing processors, such as communication devices, consumer electronics, game machines, toys, industrial control systems, transportation systems, military equipment and health-care equipment.

A detailed recent study as reported in R. Banakar, S. Steinke, B -S. Lee, M. Balakrishnan, and P. Marwedel, "Scratchpad Memory: A Design Alternative for Cache On-chip Memory in Embedded Systems." Tenth International Symposium on Hardware/Software Codesign (CODES), Estes Park, Colo., May 6-8 2002, ACM compares the tradeoffs of a cache as compared to a scratch-pad. The results are as follows: a scratch-pad memory has 34% smaller area and 40% lower power consumption than a cache memory of the same capacity. Scratch-pad memories are also often called tightly-coupled memories (TCMs) or, static random-access memories (SRAMs).

The above-mentioned savings in area and power consumption are significant, since the on-chip cache typically consumes 25-50% of the processor's area and energy consumption, a fraction that is increasing with time. Even more surprisingly, the runtime measured by Banakar et al. in cycles was 18% better with a scratch-pad using a simple static knapsack-based allocation algorithm, compared to a cache. Thus, defying conventional wisdom, Banakar et al. found absolutely no advantage to using a cache, even in high-end embedded systems in which performance is important. With the superior dynamic allocation schemes proposed here, the runtime improvement will be significantly larger. Given the power, cost, performance and real time advantages of scratch-pad, and no advantages of cache, it is expected that systems without caches will continue to dominate embedded systems in the future. Therefore, a need exists for an effective solution for scratch-pad based embedded systems.

Although many scratch-pad based embedded processors exist, utilizing them effectively has been a challenge. Central to the effectiveness of caches is their ability to maintain, at each time during program execution, the subset of data that is frequently used at that time in fast memory. The contents of cache constantly change during runtime to reflect the changing working set of data across time. Unfortunately, both existing approaches for scratch-pad allocation—program annotations and compiler-driven approaches—are static data allocations. In other words, they are incapable of changing the contents of scratch-pad at runtime. This problem is a serious limitation for existing approaches.

As an example, consider the following: let a program consist of three successive loops, the first of which makes repeated references to array A; the second to B; and the third to C. If only one of the three arrays can fit within the SRAM, any static allocation suffers DRAM accesses in two out of three arrays. In contrast, a dynamic strategy can fit all three arrays in SRAM at different times. Although this example is oversimplified, it intuitively illustrates the benefits of dynamic allocation.

Attempts so far to capture dynamic behavior in scratch-pad based systems have focused on algorithms for software caching. See, for example, G. Hallnor and S. K. Reinhardt. "A Fully Associative Software-managed Cache Design," Proc. of the 27th Int'l Symp. on Computer Architecture (ISCA), Vancouver, British Columbia, Canada, Jun. 2000; and Csaba Andras Moritz, Matthew Frank, and Saman Amarasinghe, "FlexCache: A Framework for Flexible Compiler Generated Data Caching," The 2nd Workshop on Intelligent Memory Systems, Boston, Mass., Nov. 12, 2000.

This class of methods involving software caching emulates the behavior of a hardware cache in software. In particular, a tag consisting of the high-order bits of the address is stored along with each cache line. Before each load/store, additional instructions are inserted by the compiler to mask out the high-order bits of the address, access the tag, to compare the tag with the high-order bits and then branch conditionally to hit or miss code. Some methods are able to reduce the number of such inserted overhead instructions, but much of it remains, especially for non-scientific programs. Needless to say, the inserted code adds significant overhead, including (i) additional run-time; (ii) higher code size, increasing dollar cost; (iii) higher data size from tags, also increasing cost; (iv) higher power consumption; and (v) memory latency that is just as unpredictable as hardware caches.

Some software caching schemes use dynamic compilation. The improvements of these schemes are small, but more importantly, in dynamic compilation the program is in RAM and is changed at runtime. In most embedded systems, however, since the program is in fixed-size and unchangeable ROM, dynamic compilation schemes cannot be used. Accordingly, a need exists for alternative approaches which are low overhead and avoid dynamic compilation which overcome the above-mentioned disadvantages and shortcomings.

A paper published in 2001 [M. Kandemir, J. Ramanujam, M. J. Irwin, N. Vijaykrishnan, I. Kadayif, and A. Parikh, "Dynamic Management of Scratch-Pad Memory Space," Design Automation Conference, pages 690-695, 2001] describes a methodology of moving data back and forth between DRAM and scratch-pad. The methodology applies only to global and stack array variables with the following three additional restrictions. (i) The programs should primarily access arrays through affine (linear) functions of enclosing loop induction variables. (ii) The loops must be well-structured and must not have any other control flow, such as if-else, break and continue statements. (iii) The codes must contain these constructs in a clean way without hand-optimizations often found in many such codes, such as common sub-expression eliminations and array accesses through pointer indirections; since with these features the needed affine analysis cannot succeed. Combining these three restrictions, the methodology described by Kandemir et al. applies to well-structured scientific and multimedia codes. Unfortunately, most programs in embedded systems including many of those in the control, automotive, network, communication and even DSP domains do not fit within these strict restrictions. It has been observed that even many regular array-based codes in embedded systems violate the above restrictions, especially (ii) and (iii).

Hence, a need exists for a compiler-driven dynamic memory allocation methodology for scratch-pad based embedded systems which applies to global and stack variables, and is totally general, thus allowing codes with all kinds of accesses to variables, pointers and irregular control flow.

The methodology described by Kandemir et al. considers each loop nest independently. This has several consequences. One is that the methodology is locally optimized for each loop. Another consequence is that the methodology described by Kandemir et al. makes available the entire scratch-pad for each loop nest. The methodology described by Kandemir et al. does not exploit reuses across structures like loops. A variable which can be retained in SRAM is unnecessarily transferred between SRAM and DRAM. Accordingly, a need exists for a compiler-driven dynamic memory allocation methodology for scratch-pad based embedded systems which provides a whole-program analysis across all control structures and does not consider each loop nest independently. Such a methodology would be globally optimized for the entire program, and not locally optimized for each loop.

Based on the disadvantages and shortcomings of the prior art, a need also exists for a compiler-driven dynamic memory allocation methodology for scratch-pad based embedded systems which might choose to make available the entire scratch-pad for each loop nest, but which is not constrained to do so. Finally, a need exists for a compiler-driven dynamic memory allocation algorithm for scratch-pad based embedded systems which may choose to use part of the scratch-pad for data that is shared between successive control constructs, thus saving on transfer time to DRAM.

SUMMARY OF THE INVENTION

The present disclosure provides a compiler algorithm for managing scratch-pad based systems that unlike the prior art is able to change the allocation at runtime and avoid the overheads of software caching. In particular, the algorithm of the present disclosure (i) accounts for changing program requirements at runtime; (ii) has no software-caching tags; (iii) requires no run-time checks per load/store; (iv) has extremely low overheads; and (v) yields 100% predictable memory access times.

The present disclosure further provides a methodology for allocating program data automatically in embedded computing systems containing scratch-pad memories. The invented memory allocation methodology is intended for inclusion in compilers for embedded systems. Compilers for embedded systems produce executable code for embedded processors from source-level computer programs.

The primary novelty of the invented method is that it is able to allocate all kinds of global and stack variables in programs to scratch-pad memory using a dynamic method other than software caching. A dynamic method is one where the allocation of variables in memory is allowed to change during the run of the program. The methodology disclosed herein differs from current technology in that it is the first dynamic allocation method without the overheads of software caching that is able to allocate all global and stack variables to scratch-pad memories. The result is a significant improvement in the runtime, power consumption, cost and real-time bounds of the embedded system, compared to all existing methods.

The outline of the disclosed methodology is as follows. The compiler analyzes the program to identify program points where it may be beneficial to insert code to bring in a variable, or parts of a variable, from DRAM into SRAM. It is beneficial to copy a variable into SRAM if it is repeatedly accessed thereafter and the benefit of it being in SRAM outweighs the cost of transfer. A profile-driven cost model is presented to estimate these benefits and costs. Since the compiler must ensure that at all times all the data allocated to SRAM fit in SRAM, occasionally variables must be evicted when new ones are brought in. Which variables to evict and when to evict them is also decided by the compiler. In other words, just like in a cache, data is moved back and forth between DRAM and SRAM, but under compiler control, and with hardly any additional overhead.

The above compiler algorithm for global and stack data has several innovative features which include the following. (i) To reason about the contents of SRAM across time, it is helpful to associate a concept of time with particular program points. To this end, a novel data structure called the Data Program Relationship Graph (DPRG) is used which associates a timestamp for several key program points of interest. This is the first time that a data structure has been defined to represent time during program execution. (ii) A cost model determines the runtime cost of possible transfers at each program point. (iii) A greedy compile time heuristic at each point determines, using the cost model, which transfers should be selected to maximize the overall runtime benefit. (iv) Compile-time optimizations are done to reduce the cost of data transfer. For example, if dataflow analysis reveals that a variable is not live at the point it should be transferred back to DRAM, the transfer can be deleted.

Three features of the disclosed algorithm include the following: (a) No additional transfers beyond those required by a caching strategy are done. (b) Data that is accessed only once is not brought into SRAM, unlike in caches, where the data is cached and potentially useful data evicted. This is particularly beneficial for streaming multimedia codes where use-once data is common. (c) Data known to the compiler to be dead is not written out to DRAM upon eviction, unlike in a cache, where the caching mechanism writes out all evicted data.

A decrease in energy consumption is another benefit from the disclosed algorithm. Energy consumption is an important criterion for embedded systems, especially for portable devices. Energy consumption is known to be roughly proportional to runtime when the architecture is unchanged. Since our runtime improves by 31.2% versus an optimal static allocation, it is highly likely that the energy consumption also decreases by a similar fraction. In fact, preliminary results show that the disclosed methodology lowers energy consumption by 37.9% versus the optimal static allocation scheme described in O. Avissar, R. Barua and D. Stewart, "An Optimal Memory Allocation Scheme for Scratch-Pad Based Embedded Systems," ACM Transactions on Embedded Systems (TECS), 1(1), September 2002.

BRIEF DESCRIPTION OF THE FIGURES

These and other advantages will become more apparent from the following detailed description of the various embodiments of the present disclosure with reference to the figures wherein.

DETAILED DESCRIPTION OF THE PREFERRED EMBODIMENTS

Figure 1:
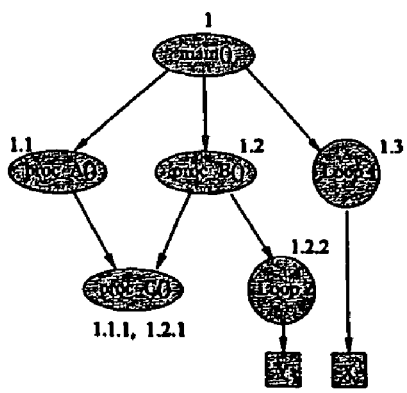
FIG. 1 illustrates an example of a Data Program Relationship Graph (DPRG) showing nodes, edges and timestamps of an exemplary program shown in section I below in accordance with the present disclosure.

The present disclosure presents a compiler-driven memory allocation scheme for embedded systems that have SRAM organized as a scratch-pad memory instead of a hardware cache. Most existing schemes for scratch-pad rely on static data assignments that never change at runtime, and thus fail to follow changing working sets; or use software caching schemes which follow changing working sets but have high overheads in runtime, code size memory consumption and real-time guarantees.

The disclosed methodology as implemented by the described algorithm presents a scheme that follows changing working sets by moving data from SRAM to DRAM, but under compiler control, unlike in a software cache, where the data movement is not predictable. Predictable movement implies that with the disclosed methodology the location of each variable is known to the compiler at each point in the program, and hence the translation code before each load/store needed by software caching is not needed. When compared to a provably optimal static allocation the results show an average of 31.2% reduction in runtime using no additional hardware support with the disclosed methodology. With hardware support for pseudo-DMA and full DMA, already provided in some commercial embedded systems, the average runtime reduction is 33.4% and 34.2%, respectively with the disclosed methodology.

The present disclosure is unique in that it describes the first and only methodology for memory allocation to scratch-pad memory in an embedded system that is dynamic, i.e., can move data between scratch-pad memory and other memories during runtime of the application, without the overheads of software caching, and without the restriction of allocating only array data accessed through affine functions. Dynamic methods offer the potential for significant improvements over static methods. Until now, dynamic methods have been considered infeasible because of the limitations of the two existing approaches: (i) software caching has significant overheads in runtime, power consumption and code size; and (ii) affine-array-based schemes are limited in scope to allocate only arrays accessed to affine functions to scratch-pad, severely limiting their applicability. The disclosed methodology as implemented by the described algorithm is the first to overcome both of these drawbacks. Further, compared to static schemes, the disclosed dynamic scheme has demonstrated better runtime and power consumption than the provably optimal static scheme.

It is apparent from the description herein that the compiler-driven memory allocation scheme of the present disclosure is meant for implementation inside of a compiler, which is the standard software tool that is used to convert programs written in high-level languages, such as C, C++ and Java, into executable machine code. A compiler is an essential part of all existing embedded software development tools. An embedded software development environment is an integrated collection of software development tools that manage the entire embedded software development process: analyzing, designing, documenting, writing, compiling, debugging, testing, optimizing, and verifying software.

I. Algorithm Overview and Data Structures Used

The algorithm of the present disclosure for implementing dynamic memory allocation of global and stack variables takes the following approach. The compiler-driven methodology inserts code into the application to copy variables from slow memory into SRAM whenever it expects them to be used frequently thereafter, as predicted or indicated by previously collected profile data. Variables placed in SRAM earlier may be evicted by moving them back to slow memory to make room for new variables. Like in caching, the data is retained in DRAM at all times even when the latest copy is in SRAM. Unlike software caching, since the compiler knows exactly where each variable is at each point in the program, no runtime checks are necessary to find the location of any given variable. Consequently the overheads and unpredictable latencies of software caching are avoided.

A compiler may determine the optimal allocation solution for globals and stacks as follows. Each solution is defined by the set of program points where transfers can take place and what variables to transfer at these points. Computing the theoretically optimal solution can be done in an exponential amount of time and like a host of other compiler problems, is almost certainly NP-complete. It can certainly be solved in an exponential amount of time by evaluating the cost of all possible solutions and choosing the solution with minimum cost. To see how, let the number of instructions, and therefore the number of program points, be n. Let the total number of global and stack variables be m. Then it can be shown that the number of solutions is $O(2^{2^{mm}})$, a large exponential.

In the absence of an optimal solution, a heuristic must be used. The disclosed algorithm has the following four steps. First, it partitions the program code into regions where the start of each region is a program point. Regions correspond to the granularity at which allocation decisions are made, i.e., the allocation stays the same within a region. Changes in allocation are made only at program points by compiler-inserted code that copies data back and forth between SRAM and DRAM. The choice of regions is discussed below in this section. Second, the disclosed methodology assigns or associates a timestamp with every program point such that (i) the timestamps form a total order among themselves; and (ii) the program points are reached during runtime in timestamp order. In general, it is not possible to assign timestamps with this property for all programs. Later in this section, however, a method is shown that by restricting the set of program points and allowing multiple timestamps per program point, timestamps for almost all programs of interest can be defined. Third, the disclosed methodology steps through the program points in timestamp order and at each point by using a detailed cost model determines the set of variables in slow memory to bring into SRAM and the set in fast memory to evict. The cost model estimates the benefit or loss from every candidate variable to bring in or evict. Then among candidate re-allocations with positive estimated benefit, the re-allocation with greatest benefit is chosen. Since each program point might have multiple timestamps, it might be assigned multiple re-allocations corresponding to each timestamp. The result is the disclosed algorithm implementing dynamic memory allocation.

The disclosed methodology is somewhat analogous to the offline paging problem although the latter is a different problem. The offline paging problem is described and a solution presented by L. A. Belady in "A study of replacement algorithms for virtual storage," IBM Systems Journal, pages 5:78-101, 1966. The offline paging problem deals with deriving an optimal page replacement strategy when future page references are known in advance. Analogously, the disclosed methodology looks at finding a memory allocation strategy when program behavior is known in advance. But there are some key differences between the two algorithms. The algorithm by Belady essentially chooses the page occurring furthest in the dynamic trace. In contrast, the disclosed algorithm associates memory allocation decisions with static points in the program. This ensures better predictability. Also, in the disclosed algorithm, the memory allocation decision is based on a cost model which takes into account both reuse and distance of occurrence of the variable. Such an approach is likely to avoid unnecessary transfers between the memory banks.

Deriving Regions and Timestamps

The choice of program points and therefore regions, is critical to the success of the algorithm. Regions are defined as the code between successive program points. It is observed that promising program points are those after which the program has a significant change in locality behavior. Further, the dynamic frequency of program points should be less than the frequency of regions, so that the cost of copying data into SRAM can be recouped by data re-use from SRAM in the following region. Thus, sites just before the start of loops are especially promising program points since they are infrequently executed compared to the insides of loops. Moreover, the subsequent loop often re-uses data, justifying the cost of data copying into SRAM. With these considerations, program points for the base algorithm described herein are defined as (i) the start of each procedure; and (ii) just before the start of every loop (even inner loops of nested loops). Program points are merely candidate sites for copying to and from SRAM; whether any copying code is actually inserted at those points is determined by a cost-model driven approach, described in section II.

An example will now be provided showing how an exemplary application program stored in the program memory in an embedded system that also has scratch-pad memory is divided into regions and then marked with timestamps in accordance with the methodology of the present disclosure. The exemplary application program is the following:

```
main ( ) {
    proc-A( )
    proc-B( )
    while (. . . ){X =. . . } /* Loop 1 */
}
proc-A ( ) {
    proc-C( )
}
proc-B ( ) {
    proc-C( )
    for (. . . ){Y =. . . } /* Loop 2 */
}
proc-C ( ) {
    . . .
}
```

The application program consists of three different types of features: four procedures, namely, main( ), proc-A( ), proc-B( ) and proc-C( ); two loops, Loop 1 and Loop2; and two variables X and Y. The application program may contain other instructions that are not shown. Only loops, procedure declarations and procedure calls are shown.

FIG. 1 shows the Data Program Relationship Graph (DPRG) for the above exemplary program. The DPRG is a novel data structure which helps in the identification of regions and marking of timestamps. The DPRG is essentially the program's call graph appended with new nodes for loops and variables. In the DPRG shown in FIG. 1, there are four procedures, two loops and two variables represented by nodes. Oval nodes represent procedures, circular nodes represent loops and square nodes represent variables. Edges to procedure nodes represent calls; edges to loop nodes shows that the loop is nested in its parent; and edges to variable nodes represent memory accesses to that variable in its parent. The DPRG is usually a directed acyclic graph (DAG), except for recursive programs, where cycles occur. The program points, namely, the starts of procedures and loops, are represented by the start of the code in each oval or circular node. In case of a loop, its program point is outside the loop at its start. In case of a procedure, its program point is inside its body at its start.

FIG. 1 also shows the one or more timestamps assigned to the starting point of each node in the DPRG. Since the starting point of each node is a program point, the assignment of timestamps to each node, timestamps the program points as well. Timestamps are derived using the following rule: the timestamp for each node is the timestamp of its parent appended by a '.' followed by a number representing which child it is in a left to right order. In this way if the main( ) function is assigned a timestamp of 1, the timestamps of all nodes can be computed by the well-known depth-first-search graph traversal method. FIG. 1 shows the results. A node may get more than one timestamp if it has more than one parent, an example of this is the node for proc-c( ), which is marked with two timestamps: 1.1.1 and 1.2.1. An ordering on timestamps is their dictionary order. In other words, timestamps are compared according to the following rule: find their longest common prefix ending by a '.'; the larger timestamp is the one with the larger subsequent number. For example, 1.2.1<1.3 since their longest common prefix ending with a '.' is "1.", and the subsequent number (2) for the first timestamp is less than that of the second timestamp (3). With such an ordering, the timestamps always form a total order among themselves.

Timestamps are useful because they reveal dynamic program execution order: the order in which the program points are visited at runtime is roughly the same as the total order of their timestamps. The only exception is when a loop node has multiple timestamps as descendants. In such case, the descendants are visited cyclically in every loop iteration; thus earlier timestamps are repeated when returning to the beginning of the loop in subsequent iterations, violating the timestamp order. Even then, we can probabilistically predict the common case time order as the cyclic order, since the end-of-loop backward branch is usually taken. Thus, we can use timestamps—derived at compile-time—to reason about dynamic execution order in the compiler across the whole program. This is a useful property and enables the derivation of a good dynamic allocation at compile-time.

Timestamps have their limitations, however, in that they cannot be derived for programs with unstructured control flow, or for recursive programs. Fortunately, unstructured control flow is exceedingly rare nowadays in any domain—only arbitrary goto statements are referred to herein; other constructs, such as break and continue statements within loops, and switch statements, are okay for timestamps. Recursive programs are also rare in embedded programs, but simple extensions of our method for recursive programs are considered in section III.

II. Algorithm for Determining Memory Transfers

This section describes the algorithm for determining the memory transfers at each program point. Before running this algorithm, the DPRG is built to identify program points and mark the timestamps. Also profiling is done to find the number of times a variable is used in a region.

An overview of the memory transfer algorithm of the present disclosure is as follows. At each program point, the algorithm determines the following memory transfers: (i) the set of variables to copy from slow memory into fast memory; and (ii) the set of variables to evict from fast memory to slow memory to make way for incoming variables. Further, the algorithm inserts code at the program points to implement the transfers. The algorithm is structured as a one-pass algorithm that iterates over all the program points in timestamp order. At each program point, variables currently in slow memory are considered for bringing into fast memory in decreasing order of frequency of access per-byte. Variables are preferentially brought into empty space if available, else into space evicted by variables that the compiler has proven to be dead at this point, or else by evicting live variables.

The algorithm next generates a candidate best-live-variable-set to evict if such eviction is necessary to create space to bring in this variable. This set is chosen by the promise-value heuristic: variables are chosen to evict if they are accessed in the furthest region in the future in timestamped order, and among variables with the same next region of access, variables with lower frequencies-per-byte of access in that region are preferred for eviction. Finally, given the variable to bring in and the candidate best-live-variable-set to evict for that variable, a detailed cost model is used to determine if this proposed swap should actually take place. In particular, copying a variable into fast memory may not be worthwhile unless the cost of the copying and the lost locality of evicted variables is overcome by its subsequent reuse from fast memory of the brought-in variable. The cost model used models all these three components of cost to derive if the swap should occur. Details of the cost model are presented later in this section. Completing this process for all variables at all timestamps yields the complete set of all memory transfers.

Detailed Algorithm

Appendix A provides a portion of the disclosed algorithm in pseudo-code form. A line-by-line description follows in the rest of this section. Appendix A begins by declaring several compiler variables. These include V-fast and V-slow to keep track of the set of application variables allocated to fast and slow memory, respectively, at the current program point. Bring-in-set and Swapout-set store their obvious meaning at each program point. Promise-value is an array of structures, one array element for each program variable. For each program variable, the structure has a field to store the timestamp of the next region that accesses that variable; and another field to store the access frequency per byte of that variable in that next region.

The algorithm is as follows. Line 1 computes the Promise-values at the first timestamp. Line 2 defines a sorted order on the Promise-value structures: the intuition is that variables that are most promising to bring into fast memory are brought to the front in the sorted order. The ordering gives a higher preference to variables accessed earlier (by comparing next-timestamp first); else if accessed at the same time, the access frequency is used to determine promise. Note, however, that Promise-values are used only as a heuristic to prune the search-space; eventually transfer decisions are made on the basis of a detailed cost model, not on Promise-value.

Continuing further, Line 4 is the main for loop that steps through all the program points in timestamp order. At each program point, line 6 steps through all the variables, giving preference to frequently accessed variables in the next region. For each variable in slow memory (line 7), it tries to see if it is worthwhile to bring it into fast memory (lines 8-12). Line 8 calls Find-swapout-set( ) which returns the set of variables most suitable for eviction (swapping out) to create space if V is to be brought in. If it is beneficial in runtime to bring V into fast memory (line 9), then Bring-in-set and Swapout-set are updated accordingly (line 10-11). After looping through all the variables, lines 15, 16, and 17 update, for the next program point, the set of variables in fast memory, the set in slow memory and the promise values, respectively.

Find-swapout-set( ) (lines 20-35) called in line 8 returns the best set of variables to copy out to slow memory when its argument V is brought in. Line 22 checks to see if space is available in fast memory for V. Space may be available from (a) the set of variables in fast memory that are no longer alive (the Deadset) found by liveness analysis as described in Andrew W. Appel and Maia Ginsburg, Modern Compiler Implementation in C, Cambridge University Press, January 1998. These need not be copied out to slow memory—a worthwhile optimization, implemented by not including the Dead-set in Swapout-set; (b) variables evicted so far from earlier calls to Find-swapout-set( ) for the same program point. Combining both these sources, if space is available, a detailed cost model in Find-benefit( ) is invoked in line 23 to estimate if bringing in V is worthwhile.

Even if space is available, bringing in V may not be worthwhile unless the cost of the copying is overcome by the subsequent reuse of V from fast memory. If space is not available, line 25 narrows down a candidate set for swapping out by using a promise-value-based heuristic. The for loop in line 26 exhaustively evaluates all subsets S of this small candidate set using the accurate cost model in Find-benefit( ) (line 28). Among these, the best is found in Best-swapout-set (line 31), and returned (line 35).

Cost Model

Finally, Find-benefit( ) (lines 36-43), the heart of the cost model, called in at lines 23 and 28 computes whether it is worthwhile, with respect to runtime, to copy in its argument V and copy out its argument Swapout-set. The net benefit of this operation is computed in line 42 as the latency-gain—latency-loss—Migration-overhead. The three terms are explained as follows. First, the latency gain is the gain from having V in fast memory in the next region, and is computed in line 36. Second, the latency loss is the loss from not having Swapout-set in fast memory in the next region; the loss from each variable in Swapout set is accumulated in lines 37-40. Third, the migration overhead is the cost of copying itself, estimated in line 41. An optimization done here is that variables that are read-only in the last region (checked in line 41) need not be written out to DRAM, since they have not been modified from their DRAM copies. This optimization provides the compile-time equivalent of the functionality to the dirty bit in cache. The end result is an accurate cost model that estimates the benefit of any candidate allocation that the algorithm generates.

III. Algorithm Modifications

For simplicity of explanation, the algorithm in section II leaves five issues unaddressed, solutions to which are presented in this section.

Offsets in SRAM

The first issue in this section is deciding where in SRAM to place the variables being swapped in. The criteria for good variable placement is twofold. First, the placement process should minimize the fragmentation that might result when variables are swapped out. Second, when a memory hole or location of a required size cannot be found, the cost of compaction should be considered in the cost model. The disclosed algorithm implements a solution to variable placement as a separate pass (not shown) at the end of the memory allocator. Similar to the memory allocator this pass visits the nodes in the timestamped order. To guide the allocation in the first step, a simple heuristic based on the lifetimes of the variables is used. If possible, the variable being swapped in is placed contiguously with variables which are likely to be swapped out at the same future timestamp, reducing the likelihood of small, useless holes. In the event that memory holes or memory locations of adequate size are not available, the next step considers if the memory can be compacted. Compaction is done only if the cost of compaction of a selected portion is amortized by the benefit gained by retaining the variable in fast memory.

Procedure Join Nodes

A second complication with the above algorithm is that for any program point having multiple timestamps, the for loop in line 4 is visited more than once, and thus more than one allocation is made for that program point. An example is node proc C( ) in the above exemplary program which has two timestamps, 1.1.1 and 1.2.1 as shown in FIG. 1. In general, the number of timestamps is the number of paths from main( ) to that node. Nodes with multiple timestamps are called join nodes since they join multiple paths from main( ). For parents of join nodes, considering the join node multiple times in the disclosed algorithm is not a problem—indeed it the right thing to do, so that the impact of the join node is considered separately for each parent.

For the join node itself, however, multiple recommended allocations result, one from each path to it, presenting a problem. One solution is duplicating the join node along each path to it, but the resulting code growth is unacceptable for embedded systems. Instead, the disclosed algorithm uses a strategy that adopts different allocation strategies for different paths but with the same code. The procedure calls are modified to pass a unique path identifier to the child node. This is used to select the allocation strategy specific to the path. The extra parameter only occurs for join nodes and nodes downstream to them in the DPRG.

Conditional Join Nodes

Join nodes can also arise due to conditional paths in the program. Examples of conditional execution include if-then, if-then-else and switch statements. In all cases, conditional execution consists of one or more conditional paths followed by an unconditional join point. Memory allocation for the conditional paths poses no difficulty; each conditional path modifies the incoming memory allocation in fast and slow memory to optimize for its own requirements. The difficulty is at the subsequent unconditional join node. Since the join node has multiple predecessors, each with a different allocation, the allocation at the join node is not fixed at compile-time.

Unlike for procedure join nodes, the current implementation makes the decision not to maintain these multiple allocations further, but to arrive at a single consensus allocation at the join point. The consensus allocation is chosen assuming the incoming allocation from the most probable predecessor, and modifying it with memory transfers for the join node. Subsequently compensation code is added at the termination of all the less probable paths to ensure that their allocation is modified to be the same as the newly computed allocation at the join node.

Conditional paths are timestamped as follows. Different conditional paths from the same condition can be visited by our memory transfer algorithm in any order, since they are independent of each other, and the result for each path depends only on the shared predecessor's allocation. Thus, the disclosed methodology timestamps sibling conditional paths in any arbitrary order, such as the program order.

The algorithm's different handling of procedure join nodes and conditional join nodes illustrates the two design choices for join nodes. In procedure join nodes, the different incoming allocations are maintained as different allocations in the join nodes themselves and in their successors. In conditional join nodes, the different incoming allocations are reconciled to a single consensus allocation at the join node. Both approaches have their advantages: maintaining different allocations in the join nodes and successors retains the best memory performance since all paths get their optimal allocation. On the other hand, having a single consensus allocation incurs less runtime overhead since, unlike with multiple allocations, no path tags or conditional memory transfers based on tags are needed. A quantitative study of the tradeoffs involved in choosing among the two allocation strategies has not been performed. Our current design and implementation chooses multiple allocations for procedure join nodes and a single allocation for conditional join nodes. The intuition for this choice is that the conditional paths tend to be shorter than procedure calls, so the likely deviation in allocations will be small among different paths, so a single allocation will not be too costly in memory performance.

Fixed Point Iteration for Loops

A third modification is needed for loops containing multiple regions within them. A problem akin to join nodes occurs for the start of such loops. There are two paths to the start of the loop—a forward edge from before the loop and a back edge from the loop end. The incoming allocation from the two paths may not be the same, violating the correctness condition that there is only one allocation at each program point. This problem is illustrated by the memory allocation in the example below.

```
main ( ) {
    proc-A(X)
    while ( . . . ) {
        /* Swap in Y, Swap out X */
        proc-A(Y)
        /* Swap in Z, Swap out Y */
        proc-A(Z)
    }
}
proc-A (X) {
    while ( . . . )
    while ( . . . )
        X = . . .
}
```

The allocation is incorrect since from the second iteration onwards, the allocation decision "Swap out X and Swap in Y" is not correct as X is no longer in fast memory. Instead Z is in fast memory. Although a solution similar to procedure nodes can be adopted, instead a fixed point iterative approach is adopted. The motivation for doing this is that in most loops, the back edge is far more frequent than the forward edge. Procedure Find-swapoutset is iterated several times over all the nodes inside the loop until the allocation converges. The allocation before entering the loop is then reconciled to obtain the allocation desired just after entering the loop; in this way, the common case of the back edge is favored for allocation over the less common forward edge. In the example, the correct allocation is shown below where the modified algorithm swaps out X and swaps in Z before the loop header.

```
main ( ) {
    proc-A(X)
    /* Swap in Z, Swap out X */
    while ( . . . ) {
        /* Swap in Y, Swap out Z */
        proc-A(Y)
        /* Swap in Z, Swap out Y */
        proc-A(Z)
    }
}
proc-A (X) {
    while ( . . . )
    while ( . . . )
        X = . . .
}
```

Recursive Functions

The method in section II does not apply to stack variables in recursive or cross-recursive procedures. With such procedures the call graph and DPRG is cyclic and hence the total size of stack data is unknown. Hence for a compiler to guarantee that any variable in a recursive procedure fits in SRAM is difficult. The disclosed algorithm places stack data in all recursive call-graph cycles in DRAM. DRAM placement is not too bad for two reasons. First, recursive procedures are relatively rare in embedded codes. Second, a nice feature of this method is that when recursive procedures are present, the globals and stack data from all non-recursive procedures in the same program can still be placed in SRAM by the algorithm.

Library Data

The disclosed methodology preserves the separate compilation of library functions, essential in a commercial environment, and yet allocates internal library data to a scratch-pad memory. Library functions are provided in most modern programming environments to encode common tasks in I/O, mathematics, graphics and other domains. Library functions are compiled by the same compiler as the applications and hence can be compiled using our technology. A key difficulty, however, is that library functions are pre-compiled just once separately from the application. Consequently data allocated internally in library functions cannot be allocated to SRAM in an application-specific manner, since the same library code is used for all applications.

The disclosed methodology can allocate all the internal data in libraries to DRAM. This, however, does not yield acceleration for library data, but is acceptable if accesses to data in libraries are a small fraction of the total number of accesses. For application programs which access data in libraries more frequently, the disclosed methodology is also able to evict a portion of data associated with the application program from the scratch-pad memory before a call by the application program to library data. The goal of evicting application data from the scratch-pad is to provide space for at least a portion of the library data to be transferred to the scratch-pad memory. The method evicts application data only if it is less frequently accessed than the library data—this is the condition that the eviction is beneficial. The location of the free space is passed as an argument to the library function. In this way the library function code remains application-independent, but some application-specific behavior is achieved.

Pointers to Global and Stack Data

Pointers that point to global and stack variables can cause incorrect execution when the latter are moved. For example, consider a pointer p that is assigned to the address of global variable a in a region where a is in SRAM. Later if p is de-referenced in a region when a is in DRAM, then p points to the incorrect version of a.

The disclosed methodology is able to address this problem as follows: First, a variable whose address is never taken is placed with no restrictions, since no pointers can point into it. Address-taken information is readily available in most compilers; in this way, many global/stack variables are unaffected by pointers. Second, variables whose address is taken have the following allocation constraint for correctness: for all regions where the variable's address is taken or where the variable may be accessed through pointers (pointer analysis provides this information), the variable must be allocated to the same memory. For example, if variable a has its address taken in region R1, and may be accessed through a pointer in region R5, then both regions R1 and R5 must allocate a to the same memory. This ensures correctness as the intended and pointed-to memory will be the same. The consensus memory bank for such regions is chosen by first finding the locally requested memory bank for each region; then the chosen bank is the frequency-weighted consensus among those requests.

In brief, the disclosed methodology determines if a variable of the application program is within a first region of the plurality of regions and whether the variable is capable of being accessed by a pointer in a second region of the plurality of regions, and, if so; allocating the variable of the application program for both regions to a single memory location during a memory transfer of the variable between the one type of memory and the scratch-pad memory.

Heap Data

The disclosed methodology does not allocate heap data in the program to SRAM. Programs with heap data still work using the disclosed methodology. However, all heap data is allocated to DRAM and the global and stack data can still use the SRAM using the disclosed methodology, but no SRAM acceleration is obtained for heaps. Heap data is difficult to allocate to SRAM at compile-time because the total amount and lifetime of heap data is often data-dependent and therefore unknowable at compile-time. Software caching strategies can be used for heap, but they have significant overheads. Another possibility for speeding up heap accesses is to use an embedded processor with both a scratch-pad and a cache, such as the ARMv6, and to allocate the heap data to the cache, thereby making heap accesses faster. Since the cache stores only heap data, it can be smaller than without the scratch-pad, and thus the disadvantages of the cache are smaller too. Further, tasks not accessing the heap can still benefit from the better real-time guarantees of the scratch-pad.

Reducing the Runtime and Code Size of Data Transfer Code

The disclosed methodology needs to copy data back and forth between SRAM and DRAM. This overhead is not unique; hardware caches also need to move data between SRAM and DRAM. The simplest way to copy is a memory-to-memory move for scalars, a for loop for arrays, and a nested loop for multi-dimensional arrays. The algorithm speeds this transfer in the following four ways. First, multi-dimensional arrays are copied by a single for loop instead of a nested loop since they are stored contiguously. Second, the for loops are unrolled by a small, fixed factor to reduce the runtime overhead from end-of-loop compare and branch instructions. Third, the code size increase from for loops inserted in the code is almost eliminated by placing the for loop in a special memory-block copy procedure that can be reused for each array transfer. Fourth, faster copying of arrays is possible in embedded processors that provide the low-cost hardware mechanisms of Direct Memory Access (DMA) or pseudo-DMA. DMA accelerates data transfers within memory banks and from memory to I/O devices. Pseudo-DMA accelerates transfers from memory to CPU registers, and thus can be used to speed memory-to-memory copies via registers. Section IV evaluates the runtime improvements from using DMA and pseudo-DMA instead of software transfers.

IV. Results

This section presents preliminary results by comparing the disclosed methodology against the provably optimal static allocation described by Avissar et al. The front-end allocation portion of the algorithm was implemented in the public-domain GCC cross-compiler targeting the Motorola M-Core embedded processor. The back-end code-transformation portion of the algorithm (insertion of code to copy the data between SRAM and DRAM) is not yet complete, so the allocations derived automatically by the front-end allocation portion were manually inserted into the code at the source level. Since the resulting executable code is the same as to what will be produced by automating the back-end, manual coding causes no error. The executables were simulated on a public-domain cycle-accurate simulator for the Motorola M-Core. The provably optimal static method described by Avissar et al. was fully implemented in the same GCC compiler for M-Core.

The memory characteristics and benchmarks are as follows. The M-Core chip simulated has a 256 Kbyte external DRAM with 10-cycle read/write latency, and an internal SRAM with 1-cycle read/write latency. The size of the SRAM is varied to be 25% of the size of the benchmark data. The names and characteristics of the benchmarks evaluated are shown in Table 1. The benchmarks selected only use global and stack data, rather than heap data. Heap data is allocated to the DRAM in the current compiler.

TABLE 1

Benchmark programs and characteristics.

| Benchmark | Source | Description | Total Data Size (in bytes) |
|---|---|---|---|
| MXM | Spec92 | Matrix multiply | 280024 |
| HISTOGRAM | UTDSP | Image enhancing application | 1056816 |
| EDGE DETECT | UTDSP | Edge Detection in an image | 3145856 |
| BMCM | Perfect Club | Molecular dynamics of water | 199536 |
| D-FFT | UTDSP | Application with two FFT kernels | 32816 |

Experiments were conducted with the pure software method, as well as with hardware acceleration from both DMA and pseudo-DMA; their transfer times were estimated in the simulator as follows. First, DMA accelerates data transfers within memory banks and from memory to I/O devices. It is usually implemented by fetching multiple consecutive words from DRAM for every access, and transferring them on the memory bus one word at a time. For a 10-cycle DRAM latency and an assumed 4-word wide DRAM, this results in four words transferred in the first four cycles of every 10 cycles, which implies that $(10=4)\_N= 2.5N$ cycles are needed to transfer N words. Second, pseudo-DMA accelerates transfers from memory to CPU registers, and thus can be used to speed memory-to-memory copies via registers. Pseudo-DMA functions are reported to obtain speeds of up to 53.6 Mbyte/s for a M-CORE processor with a 50 MHz speed. This is nearly four times the speed that can be achieved using conventional single load/store instructions. A factor of two was conservatively used in the simulator estimates.

Figure 2:
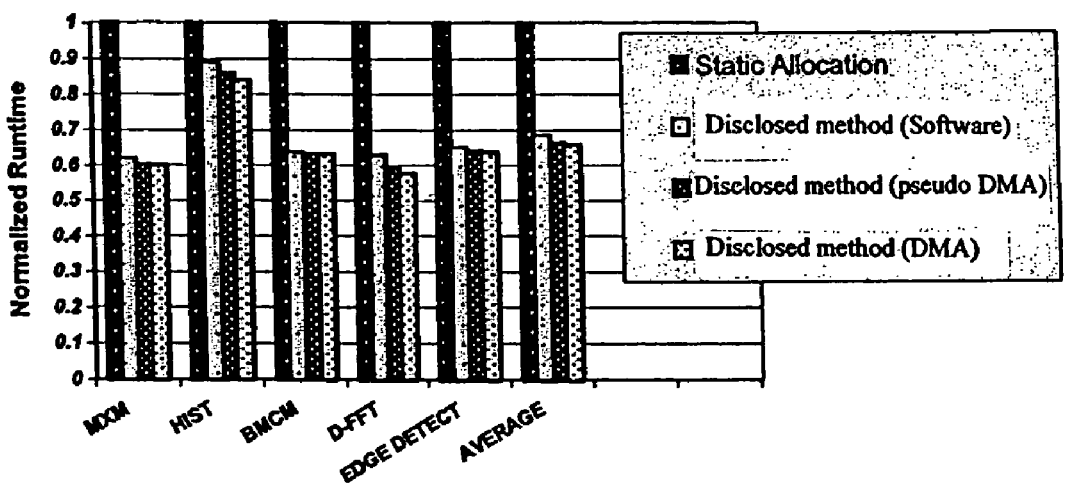
FIG. 2 is a graph showing the normalized simulated runtimes on the Y-axis for each benchmark on the X-axis. For each benchmark, the normalized runtime for four different memory allocation methodologies is shown, including memory allocation methodologies according to the present disclosure.

FIG. 2 compares the runtimes for different allocation methods. On the X-axis are the benchmarks; for each benchmark, runtimes for four configurations are shown, which are, from left to right, (i) the provably optimal static allocation derived as described by Avissar et al.; (ii) the disclosed methodology implemented by software alone; (iii) the disclosed methodology accelerated by pseudo-DMA; and (iv) the disclosed methodology accelerated by DMA. The runtimes are normalized to 1.0 for the static allocation. Comparing the first bar with the second for each benchmark, one can see that the benchmarks achieve runtimes gains ranging from 11% to 38%, averaging 31.2%, from using the disclosed methodology as compared to the optimal static allocation. The average gains increase to 33.4% and 34.2% with pseudo-DMA and DMA, respectively. The impressive speedups show that the disclosed methodology is able to use dynamic data movement to more fully exploit the potential of scratch-pad memory. Further, it is believed that the current numbers underestimate the runtime improvement in the following way. They are on small programs necessitated because of the hand-coding in the code generation step. For larger programs the improvement is likely to be larger, as they tend to have more phases of computation, and thus less likelihood that a static allocation will do well.

FIG. 2 also reveals that not every program benefits equally from the disclosed methodology. In fact, the gains range widely from 11% to 38%. This is not surprising since the gain depends on whether there are a significant number of regions in the program where data is re-used within that region or across the next few regions, before the data needs to be evicted because of the working set change. Without reuse, the cost of bringing in and swapping out the variable would not be recouped by reduction in latency in the region, and the disclosed methodology will correctly decide not to bring in data. No benefit without reuse is the case in caches too; a cache is also not beneficial without data re-use. It is important to note that for programs for which a low benefit is obtained, it is because of the program's intrinsic property of low data reuse, and not because of deficiencies in our method of exploiting reuse.

Figure 3:
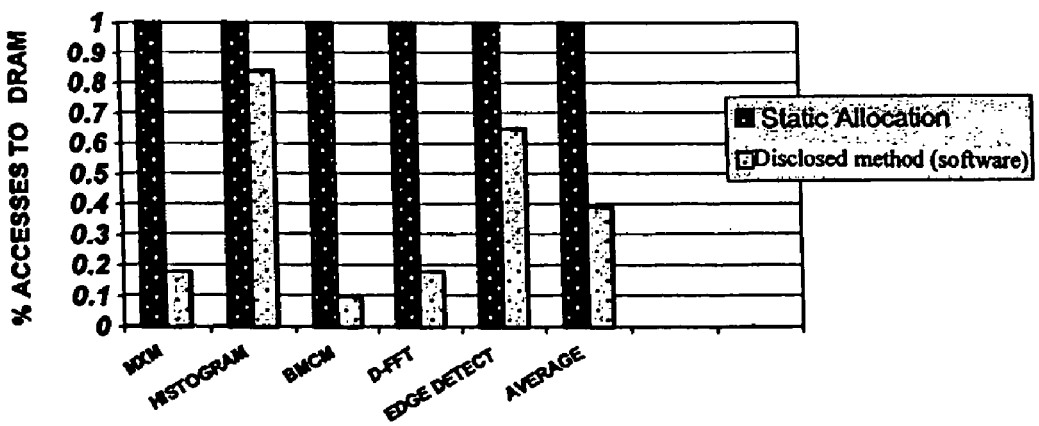
FIG. 3 is a graph showing the reduction in percentage of memory accesses going to DRAM for each benchmark shown in FIG. 2.

FIG. 3 shows the reduction in percentage of memory accesses going to DRAM because of the improved locality to SRAM afforded by the disclosed methodology. The average reduction across benchmarks is a very significant 61% reduction in DRAM accesses. Note that the total number of memory accesses actually increases in the disclosed methodology because of the added transfer code, but the reduced number of accesses to DRAM more than compensates for this increase, delivering an overall reduction in runtime.

In the evaluation, an SRAM of size equal to 25% of the size of the program data was used. An alternative would have been to use a fixed size SRAM for all programs. It is believed that a fixed SRAM size would be a poor choice to evaluate the benefits of the disclosed methodology, since it would yield results that are non-intuitive and extremely data-dependent. In particular, programs with small data set sizes would yield small benefits since most data would fit in SRAM, but the very same program with a larger data set size would get larger benefits. To get fair numbers, one would need a "typical" data set size, but often there is no such typical size, and the results could be misleading. The use of an SRAM size that varies with the data set size as a fixed fraction of it avoids such dependence with data set size and yields more meaningful results.

V. Synopsis of the Memory Allocation Methodology

This section presents a brief outline of the technical approach followed by the disclosed methodology. The dynamic memory allocation methodology for global and stack variables takes the following approach. At compile-time, the method inserts code into the application to copy variables from DRAM into SRAM whenever it expects them to be used frequently thereafter, as predicted by previously collected profile data. Variables in SRAM may be evicted by copying them back to slow memory to make room for new variables. Like in caching, the data is retained in DRAM at all times even when the latest copy is in SRAM. Unlike software caching, since the compiler knows exactly where each variable is at each program point, no runtime checks are needed to find the location of any given variable.

Figure 4:
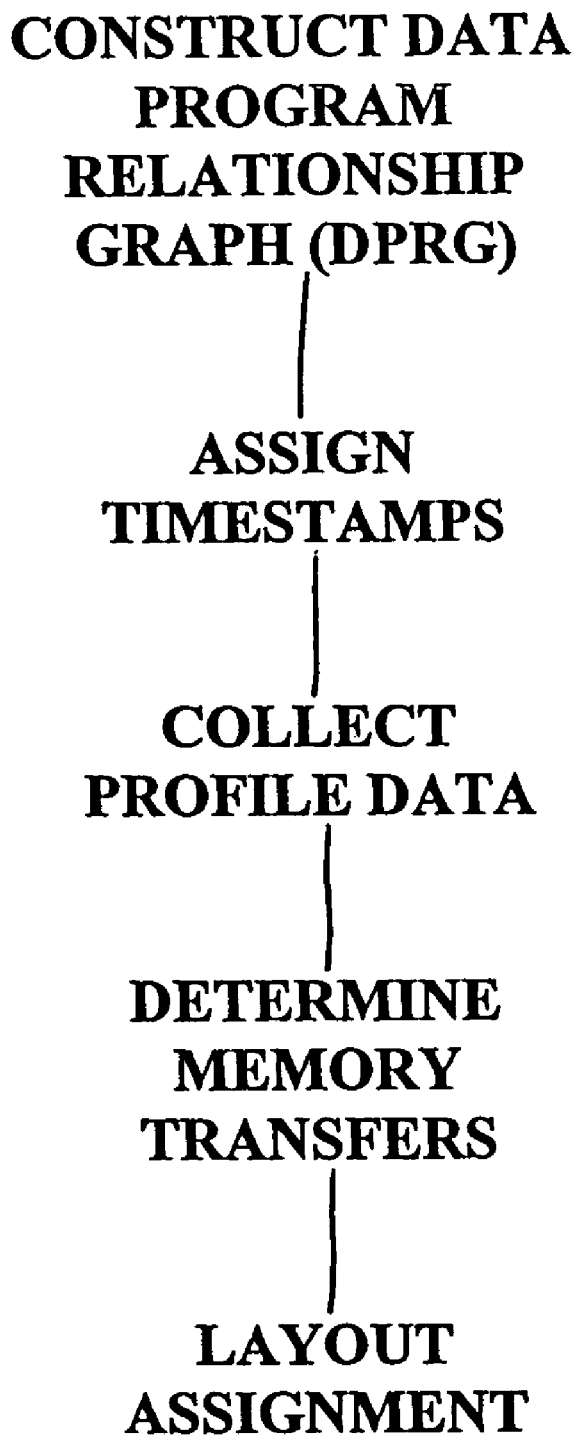
FIG. 4 is a flowchart illustrating the main procedural blocks of the methodology according to the present disclosure.

To compute the memory allocation the methodology according to the present disclosure follows five main procedural steps as shown by the blocks of FIG. 4 and described below.

(1) DPRG construction (Block 400): Initially, the compiler partitions the application program into regions, and represents the regions by a new data structure called the Data Program Relationship Graph (DPRG). FIG. 1 shows the DPRG for an application code listed above. The DPRG has nodes for every procedure, loop and variable in the code. Edges to procedure and loop nodes represent control flow, and edges to variables represent data accesses. The compiler defines a new region to start at the start and end of every procedure and every loop in the program. Thus, the left (start) and right(end) of every procedure and loop node, shown numbered on FIG. 1, are the starting points of successive regions in the program. The purpose of the regions is that memory transfers between SRAM and DRAM are inserted at the start of regions. This choice of regions is promising since it corresponds to significant changes in locality behavior across regions.

(2) Assigning timestamps (Block 402): FIG. 1 shows the timestamps at the starting point of every region, i.e., the start (left) and end (right) of every procedure and loop node. The goal is to number timestamps in the application's runtime order. This numbering is computed at compile-time by the well-known depth-first-search (DFS) graph traversal method. DFS is modified to traverse nodes every time they are seen, rather than only the first time. This still terminates since the DPRG is a DAG for non-recursive functions. Such repeated traversal results in nodes that have multiple paths to them from main( ) getting multiple timestamps. For example, node proc-C( ) gets two timestamps—1.1.1 and 1.2.1. Timestamps are useful since they reveal dynamic execution order: the runtime order in which the regions are visited is roughly the order of their timestamps. The only exception is when a loop node has multiple timestamps as descendants. Here the descendants are visited in every iteration, repeating earlier timestamps, thus violating the timestamp order. Even then, one can predict the common case time order as the cyclic order, since the end-of-loop backward branch is usually taken. Thus, timestamps can be used, at compile-time, to reason about dynamic execution order across the whole program.

(3) Profile collection (Block 404): Next, profile data is collected to measure the frequency of access to each variable for each region. Since this data is independent of the memory allocation, it can be collected using an initial run of the compiler without memory allocation. In this initial profile run, the code is instrumented with software counters to measure the frequencies of access to each variable. This profile data is used in the second compiler run to determine the memory transfers at the start of each region.

(4) Determining sequential memory transfers (Block 406): Next, the compiler determines sequential memory transfers between SRAM and DRAM at the starting point of every region, in the order of their timestamps, i.e., timestamp order. An intuitive overview follows. For each region's start, the memory allocation is obtained by modifying the incoming allocation from the immediately preceding region. The previous allocation is modified to copy in variables that are frequently used in the current region, and evict variables in SRAM that will not be used until a future region with the greatest timestamp. However, a variable is not copied into SRAM if the compiler estimates that the cost of copying is likely to exceed the benefit from better locality.

(5) Layout assignment (Block 408): Finally the compiler decides the offsets of variables in SRAM. It visits the regions in the timestamped order, and tries to place the variables copied into SRAM contiguously with other variables that will be evicted at a similar time as this variable. This reduces the likelihood of small, useless holes in the future. Compaction in SRAM is used when memory holes or memory locations of adequate size are not available. Compaction is done only if a cost model predicts that its cost is recovered by the benefit of retaining the variable in SRAM.

The described methodology and algorithm of the present disclosure can also be used as a tool for determine the optimum size of scratch-pad memory in customizable embedded systems-on-chip (SoCs). A typical problem is to find the minimum scratch-pad size that meets a given runtime and/or energy requirement. This problem can be solved by repeated compilation for varying memory sizes in a binary search to find the minimum configuration which meets the requirements.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A method for dynamic memory allocation in a scratch-pad based embedded system, said method comprising the steps of:
   partitioning an application program stored within the scratch-pad based embedded system into a plurality of regions;
   representing the plurality of regions with a data structure having a plurality of nodes defining the regions, wherein each node represents one of a procedure, loop and variable of the application program;
   assigning a timestamp to a starting point of each procedure and loop node of the plurality of nodes to form a timestamp order, the timestamp associated with each node of the data structure representing time order of execution during program execution;
   determining a sequence of memory transfers at the starting point of each procedure and loop node between one type of memory and a scratch-pad memory of the embedded system in accordance with the timestamp order associated with the data structure, wherein the starting point of each procedure and loop node is a program point of the application program; and
   performing memory transfers between the one type of memory and the scratch-pad memory at at least one program point of the application program during runtime according to the timestamp order.

2. The method according to claim 1, wherein the method is performed by a compiler of the embedded system.

3. The method according to claim 1, wherein the step of performing memory transfers comprises the step of reducing the runtime associated with transferring a multi-dimensional array from the one type of memory to the scratch-pad memory, the reducing step comprises the steps of:
   copying the multi-dimensional array by using a for loop;
   unrolling the for loop by a fixed factor;
   placing the for loop in a memory-block copy procedure for reusing the for loop for multi-dimensional array transfers between the one type of memory and the scratch-pad memory; and
   using the for loop to transfer the multi-dimensional array from the one type of memory to the scratch-pad memory.

4. The method according to claim 1, wherein the step of assigning a timestamp comprises the steps of:
   determining the timestamp to assign to the starting point of each procedure and loop node according to a runtime order of the application program; and
   assigning at least two timestamps to a node of the plurality of nodes having at least two paths to the node from another node.

5. The method according to claim 1, further comprising the steps of:
   collecting profile data for each variable of the application program;
   measuring the frequency of access to each variable of the application program for each region using the collected profile data to obtain frequency of access measurements for each variable;
   copying at least one variable from the one type of memory to the scratch-pad memory whenever the at least one variable is expected to be used as indicated by frequency of access measurements corresponding to the at least one variable; and
   moving the at least one variable from the scratch-pad memory to the one type of memory.

6. The method according to claim 5, wherein the at least one variable is one of a global and stack variable.

7. The method according to claim 5, wherein the copying step comprises the steps of:
   swapping the at least one variable with at least one other variable in the scratch-pad memory to place the at least one variable in the scratch-pad memory according to a cost model, the swapping step comprising the steps of:
      determining a location in the scratch-pad memory to place the at least one variable which minimizes memory fragmentation in the scratch-pad memory following the swapping step; and
      considering in the cost model a compaction cost associated with performing a compaction of the scratch-pad memory when a memory location of a required size cannot be located in the scratch-pad memory for placing the at least one variable.

8. The method according to claim 7, wherein the swapping step comprises the step of placing the at least one variable contiguously with at least one variable in the scratch-pad memory likely to be removed from the scratch-pad memory during a particular timestamp of the timestamp order.

9. The method according to claim 1, further comprising the step of evicting a portion of data associated with the application program from the scratch-pad memory before a call by the application program to library data to provide space within the scratch-pad memory for at least a portion of the library data to be transferred to the scratch-pad memory.

10. The method according to claim 1, further comprising the steps of:
   determining if a variable of the application program is within a first region of the plurality of regions and whether the variable is capable of being accessed by a pointer in a second region of the plurality of regions, and, if so;

allocating the variable of the application program for both regions to a single memory location during a memory transfer of the variable between the one type of memory and the scratch-pad memory.

11. The method according to claim 1, wherein the memory transfers include transferring at least one variable from a first memory of the different memories into a second memory of the different memories and evicting at least one variable from the second memory to make sufficient room in the second memory for the at least one variable transferred from the first memory, including selecting the variable to be evicted, the method further comprising the step of passing one time through the application program in timestamp order for inserting code at appropriate program points in the application program to implement the memory transfers.

12. In an embedded system having a processor running a compiler and a memory means storing an application program, a method comprising the computer-implemented steps of:
    partitioning by the compiler the application program stored within the memory means into a plurality of regions;
    representing the plurality of regions with a data structure having a plurality of nodes defining the regions, wherein each node represents one of a procedure, loop and variable of the application program;
    assigning a timestamp to a starting point of each procedure and loop node of the plurality of nodes to form a timestamp order, the timestamp associated with each node of the data structure representing time order of execution during program execution;
    determining a sequence of memory transfers at the starting point of each procedure and loop node between one type of memory and a scratch-pad memory of the embedded system in accordance with the timestamp order associated with the data structure, wherein the starting point of each procedure and loop node is a program point of the application program; and
    performing memory transfers between the one type of memory and the scratch-pad memory at at least one program point of the application program during runtime according to the timestamp order.

13. In the embedded system according to claim 12, the method further comprising the computer-implemented steps of:
    collecting profile data for each variable of the application program; measuring the frequency of access to each variable of the application program for each region using the collected profile data to obtain frequency of access measurements for each variable;
    copying at least one variable from the one type of memory to the scratch-pad memory whenever the at least one variable is expected to be used as indicated by frequency of access measurements corresponding to the at least one variable; and
    moving the at least one variable from the scratch-pad memory to the one type of memory.

14. In the embedded system according to claim 13, the method further comprising the computer-implemented steps of:
    swapping the at least one variable with at least one other variable in the scratch-pad memory to place the at least one variable in the scratch-pad memory according to a cost model, the swapping step comprising the steps of:
    determining a location in the scratch-pad memory to place the at least one variable which minimizes memory fragmentation in the scratch-pad memory following the swapping step; and
    considering in the cost model a compaction cost associated with performing a compaction of the scratch-pad memory when a memory location of a required size cannot be located in the scratch-pad memory for placing the at least one variable.

15. In the embedded system according to claim 14, wherein the computer-implemented swapping step further comprises the computer-implemented step of placing the at least one variable contiguously with at least one variable in the scratch-pad memory likely to be removed from the scratch-pad memory during a particular timestamp of the timestamp order.

16. In the embedded system according to claim 12, the method further comprising the computer-implemented step of evicting a portion of data associated with the application program from the scratch-pad memory before a call by the application program to library data to provide space within the scratch-pad memory for at least a portion of the library data to be transferred to the scratch-pad memory.

17. In the embedded system according to claim 12, the method further comprising the computer-implemented steps of:
    determining if a variable of the application program is within a first region of the plurality of regions and whether the variable is capable of being accessed by a pointer in a second region of the plurality of regions, and, if so;
    allocating the variable of the application program for both regions to a single memory location during a memory transfer of the variable between the one type of memory and the scratch-pad memory.

18. In an embedded system having a processor running a compiler and a memory means storing an application program and program data, a method comprising the computer-implemented steps of:
    executing the application program stored within the memory means; and
    changing memory allocation of at least one variable of the application program between two different memories of the memory means during execution of the application program;
    wherein the application program includes a first and second loop and a shared variable of the at least one variable is used by both the first and second loops, and a determination of memory allocation for the shared variable between the two different memories is determined by considering usage of the shared variable by both the first and second loops, and wherein the starting point of each first and second loop is a program point of the application program; and
    performing memory transfers between the two different memories at at least one program point of the application program during runtime according to a timestamp order.

19. In the embedded system according to claim 18, wherein the at least one variable is one of a global and stack variable.

20. An embedded system comprising:
    means for partitioning an application program into a plurality of regions;
    means for representing the plurality of regions with a data structure having a plurality of nodes defining the regions, wherein each node represents one of a procedure, loop and variable of the application program;

means for assigning a timestamp to a starting point of each procedure and loop node of the plurality of nodes to form a timestamp order, the timestamp associated with each node of the data structure representing time order of execution during program execution;

means for determining a sequence of memory transfers at the starting point of means for determining a sequence of memory transfers at the starting point of each procedure and loop node between one type of memory and a scratch-pad memory of the embedded system in accordance with the timestamp order associated with the data structure, wherein the starting point of each procedure and loop node is a program point of the application program; and means for performing memory transfers between the one type of memory and the scratch-pad memory at at least one program point of the application program during runtime according to the timestamp order.

21. The embedded system according to claim 20, further comprising:

means for collecting profile data for each variable of the application program;

means for measuring the frequency of access to each variable of the application program for each region using the collected profile data to obtain frequency of access measurements for each variable;

means for copying at least one variable from the one type of memory to the scratch-pad memory whenever the at least one variable is expected to be used as indicated by frequency of access measurements corresponding to the at least one variable; and means for moving the at least one variable from the scratch-pad memory to the one type of memory.

22. The embedded system according to claim 21, further comprising:

means for swapping the at least one variable with at least one other variable in the scratch-pad memory to place the at least one variable in the scratch-pad memory according to a cost model, the means for swapping comprising:

means for determining a location in the scratch-pad memory to place the at least one variable which minimizes memory fragmentation in the scratch-pad memory following the swapping step; and means for considering a compaction cost associated with performing a compaction of the scratch-pad memory when a memory location of a required size cannot be located in the scratch-pad memory for placing the at least one variable.

23. The embedded system according to claim 22, wherein the means for swapping further comprises means for placing the at least one variable contiguously with at least one variable in the scratch-pad memory likely to be removed from the scratch-pad memory during a particular timestamp of the timestamp order.

24. The embedded system according to claim 21, further comprising means for evicting a portion of data associated with the application program from the scratch-pad memory before a call by the application program to library data to provide space within the scratch-pad memory for at least a portion of the library data to be transferred to the scratch-pad memory.

25. The embedded system according to claim 21, further comprising means for determining if a variable of the application program is within a first region of the plurality of regions and whether the variable is capable of being accessed by a pointer in a second region of the plurality of regions, and, if so, allocating the variable of the application program for both regions to a single memory location during a memory transfer of the variable between the one type of memory and the scratch-pad memory.

26. An embedded system comprising:

means for executing an application program stored within a memory means; and means for changing a memory allocation of at least one variable of the application program between two different memories of the memory means during execution of the application program, wherein the changing of memory allocation is determined by the means for executing, wherein the application program includes a first and second loop and a shared variable of the at least one variable is used by both the first and second loops, and the means for executing determines a memory allocation change for the shared variable by considering usage of the shared variable by both the first and second loops, and wherein the starting point of each first and second loop is a program point of the application program; and means for performing memory transfers between the two different memories at at least one program point of the application program during runtime according to a timestamp order.

27. The embedded system according to claim 26, wherein the at least one variable is one of a global and stack variable.

28. A computer readable medium storing a set of computer readable instructions capable of being executed by at least one processor for performing dynamic memory allocation in a scratch-pad based embedded system, the readable instructions comprising:

means for partitioning an application program stored within the scratch-pad based embedded system into a plurality of regions;

means for representing the plurality of regions with a data structure having a plurality of nodes defining the regions, wherein each node represents one of a procedure, loop and variable of the application program;

means for assigning a timestamp to a starting point of each procedure and loop node of the plurality of nodes to form a timestamp order, the timestamp associated with each node of the data structure representing time order of execution during program execution;

means for determining a sequence of memory transfers at the starting point of each procedure and loop node between one type of memory and a scratch-pad memory of the embedded system in accordance with the timestamp order associated with the data structure, wherein the starting point of each procedure and loop node is a program point of the application program: and means for performing memory transfers between the one type of memory and the scratch-pad memory at at least one program point of the application program, during runtime according to the timestamp order.

29. The computer readable medium according to claim 28, wherein the starting point of each procedure and loop node is a program point of the application program, and the readable instructions further comprising means for performing memory transfers between the one type of memory and the scratch-pad memory at at least one program point of the application program during runtime according to the timestamp order.

30. The computer readable medium according to claim 29, wherein the means for performing memory transfers comprises means for reducing the runtime associated with transferring a multi-dimensional array from the one type of memory to the scratch-pad memory, the means for reducing comprising:
- means for copying the multi-dimensional array by using a for loop;
- means for a unrolling the for loop by a fixed factor;
- means for placing the for loop in a memory-block copy procedure for reusing the for loop for multi-dimensional array transfers between the one type of memory and the scratch-pad memory; and
- means for using the for loop to transfer the multi-dimensional array from the one type of memory to the scratch-pad memory.

31. The computer readable medium according to claim 28, wherein the means for assigning a timestamp comprises:
- means for determining the timestamp to assign to the starting point of each procedure and loop node according to a runtime order of the application program; and
- means for assigning at least two timestamps to a node of the plurality of nodes having at least two paths to the node from another node.

32. The computer readable medium according to claim 28, further comprising:
- means for collecting profile data for each variable of the application program;
- means for measuring the frequency of access to each variable of the application program for each region using the collected profile data to obtain frequency of access measurements for each variable;
- means for copying at least one variable from the one type of memory to the scratch-pad memory whenever the at least one variable is expected to be used as indicated by frequency of access measurements corresponding to the at least one variable; and
- means for moving the at least one variable front the scratch-pad memory to the one type of memory.

33. The computer readable medium according to claim 32, wherein the means for copying comprises:
- means for swapping the at least one variable with at least one other variable in the scratch-pad memory to place the at least one variable in the scratch-pad memory according to a cost model, the swapping comprising:
- means for determining a location in the scratch-pad memory to place the at least one variable which minimizes memory fragmentation in the scratch-pad memory following the swapping; and
- means for considering in the cost model a compaction cost associated with performing a compaction of the scratch-pad memory when a memory location of a required size cannot be located in the scratch-pad memory for placing the at least one variable.

34. The computer readable medium according to claim 33, wherein the means for swapping comprises means for placing the at least one variable contiguously with at least one variable in the scratch-pad memory likely to be removed from the scratch-pad memory during a particular timestamp of the timestamp order.

35. The computer readable medium according to claim 28, further comprising means for evicting a portion of data associated with the application program from the scratch-pad memory before a call by the application program to library data to provide space within the scratch-pad memory for at least a portion of the library data to be transferred to the scratch-pad memory.

36. The computer readable medium according to claim 28, further comprising:
- means for determining if a variable of the application program is within a first region of the plurality of regions and whether the variable is capable of being accessed by a pointer iii a second region of the plurality of regions, and;
- means for allocating the variable of the application program for both regions, when the variable is determined capable, to a single memory location during a memory transfer of the variable between the one type of memory and the scratch-pad memory.

* * * * *